(12) United States Patent
Kobayashi et al.

(10) Patent No.: US 10,532,492 B2
(45) Date of Patent: Jan. 14, 2020

(54) TWIN-SCREW EXTRUDER INCLUDING VARIABLE DIAMETER OF SCREWS AND BARREL AND KNEADING METHOD USING THE TWIN-SCREW EXTRUDER INCLUDING VARIABLE DIAMETER OF SCREWS AND BARREL

(71) Applicant: Toshiba Kikai Kabushiki Kaisha, Chiyoda-ku, Tokyo (JP)

(72) Inventors: Akiyoshi Kobayashi, Fuji (JP); Toshiki Nakazawa, Yokohama (JP); Masatoshi Ohara, Mishima (JP); Hiroyuki Saito, Numazu (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 987 days.

(21) Appl. No.: 14/941,439

(22) Filed: Nov. 13, 2015

(65) Prior Publication Data
US 2016/0207225 A1    Jul. 21, 2016

Related U.S. Application Data

(63) Continuation of application No. PCT/JP2014/060421, filed on Apr. 10, 2014.

(30) Foreign Application Priority Data

May 15, 2013    (JP) ................................ 2013-102652

(51) Int. Cl.
*B29B 7/48*     (2006.01)
*B29C 48/52*    (2019.01)
(Continued)

(52) U.S. Cl.
CPC ................ *B29B 7/489* (2013.01); *B29B 7/82* (2013.01); *B29B 7/847* (2013.01); *B29B 7/90* (2013.01);
(Continued)

(58) Field of Classification Search
CPC ........... B29B 7/489; B29B 7/847; B29B 7/82; B29B 7/90; B29B 7/845; B29C 47/402;
(Continued)

(56) References Cited

U.S. PATENT DOCUMENTS

| 4,534,652 A | 8/1985 | Stade |
| 4,902,455 A * | 2/1990 | Wobbe .................. B29C 47/367 264/102 |

(Continued)

FOREIGN PATENT DOCUMENTS

| CN | 1076885 | 10/1993 |
| CN | 1134684 | 10/1996 |

(Continued)

OTHER PUBLICATIONS

English Language Abstract and Translation for JP H10-238548 published Sep. 8, 1998.

(Continued)

*Primary Examiner* — Charles Cooley
(74) *Attorney, Agent, or Firm* — DLA Piper LLP US

(57) ABSTRACT

One embodiment provides a twin-screw extruder which is used to knead materials and has excellent productivity. The twin-screw extruder includes screws. The screws include double thread screws in which first screw portions engage with each other. Ratio D1/C of external diameter D1 of the first screw portion to a shaft distance C ranges from 1.25 to 1.40. The screws further include triple thread screws in which third screw portions engage with each other. Ratio D3/C of external diameter D3 of the third screw portion to the shaft distance C ranges from 1.05 to 1.10. External diameter D2 of a second screw portion decreases gradually from the first screw portion toward the third screw portion.

2 Claims, 2 Drawing Sheets

(51) Int. Cl.
  *B29C 48/53* (2019.01)
  *B29C 48/40* (2019.01)
  *B29C 48/645* (2019.01)
  *B29B 7/82* (2006.01)
  *B29B 7/90* (2006.01)
  *B29B 7/84* (2006.01)
  *B29K 23/00* (2006.01)
  *B29K 105/00* (2006.01)
  *B29K 509/00* (2006.01)

(52) U.S. Cl.
  CPC ............ *B29C 48/402* (2019.02); *B29C 48/52* (2019.02); *B29C 48/53* (2019.02); *B29C 48/645* (2019.02); *B29K 2023/12* (2013.01); *B29K 2105/251* (2013.01); *B29K 2509/00* (2013.01)

(58) Field of Classification Search
  CPC .............. B29C 47/6018; B29C 47/622; B29C 47/6056; B29C 47/6012; B29C 48/57; B29C 48/645; B29C 48/402; B29C 48/53; B29C 48/52; B29K 2105/251; B29K 2023/12; B29K 2509/00
  USPC ............................... 425/200–209; 366/79–91
  See application file for complete search history.

(56) References Cited

U.S. PATENT DOCUMENTS

| | | | |
|---|---|---|---|
| 6,220,745 B1 * | 4/2001 | Kobayashi | B29C 47/0871 366/142 |
| 2008/0267003 A1 * | 10/2008 | Kasliwal | B29C 47/38 366/85 |
| 2009/0175118 A1 * | 7/2009 | Kasliwal | B29C 47/38 366/85 |
| 2011/0141843 A1 | 6/2011 | Bierdel | |
| 2013/0163373 A1 | 6/2013 | Yamaguchi | |
| 2016/0207225 A1 * | 7/2016 | Kobayashi | B29C 47/402 |

FOREIGN PATENT DOCUMENTS

| | | | | |
|---|---|---|---|---|
| DE | 1 778 097 C | | 1/1973 | |
| DE | 32 06 325 A1 | | 9/1983 | |
| JP | 59-026237 | | 2/1984 | |
| JP | 61-242822 | | 10/1986 | |
| JP | 63-202408 | | 8/1988 | |
| JP | 02120006 A | * | 5/1990 | ............ B29C 47/44 |
| JP | H10-238548 | | 9/1998 | |
| JP | H11-512666 | | 11/1999 | |
| JP | 2000-025094 | | 1/2000 | |
| JP | 2000-289087 | | 10/2000 | |
| JP | 2005035286 A | * | 2/2005 | ......... B29C 47/6018 |
| JP | 2011-524281 | | 9/2011 | |
| JP | 2012-051363 | | 3/2012 | |
| WO | WO 97/12746 | | 4/1997 | |
| WO | WO 2009/152948 | | 12/2009 | |

OTHER PUBLICATIONS

English Language Translation for JP H11-512666 published Nov. 2, 1999.
English Language Abstract and Translation for JP 2000-025094 published Jan. 25, 2000.
English Language Abstract and Translation of JP 2000-289087 published Oct. 17, 2000.
English Language Abstract of JP 63-202408 published Aug. 22, 1988.
English Language Abstract of JP 59-026237 published Feb. 10, 1984.
English Language Abstract of JP 61-242822 published Oct. 29, 1986.
English Language Abstract and Translation of JP 2011-524281 published Sep. 1, 2011 (English Language Family equivalent DE 102008029305 provided).
English Language Abstract and Translation of JP 2012-051363 published Mar. 15, 2012.
English Language translation of International Search Report for PCT/JP2014/060421 dated Jun. 10, 2014.
English Language translation of International Preliminary Report on Patentability for PCT/JP2014/060421 dated Nov. 17, 2015.
Chinese Office Action (with English Translation) issued in Chinese Application No. 201480026786.2 dated Jun. 29, 2016.
English Language Abstract and English Language Translation of CN 1076885 published Oct. 6, 1993.
English Language Abstract and English Language Translation of CN 1134684 published Oct. 30, 1996.
English Language Abstract and English Language Translation of WO 2009/152948 published Dec. 23, 2009.
German Office Action (with English Translation) issued in DE Application No. 112014002426.0 dated Oct. 31, 2018.

* cited by examiner

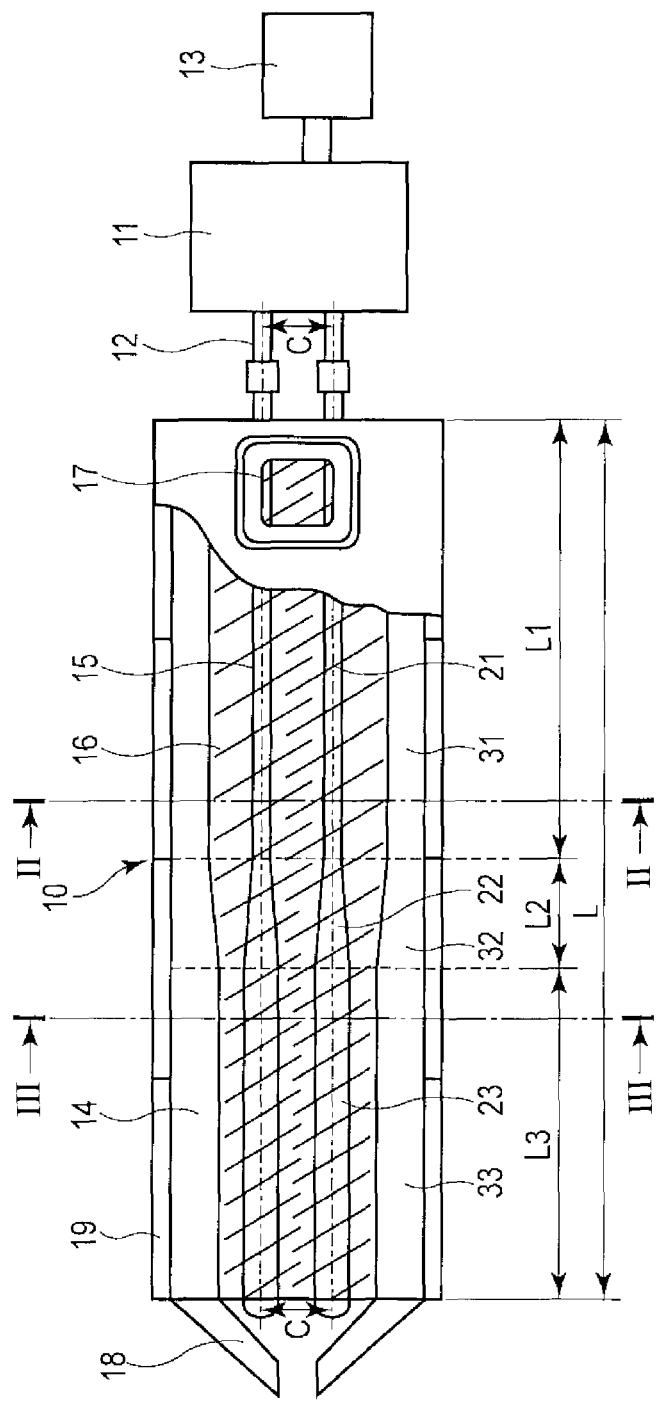
F I G. 1

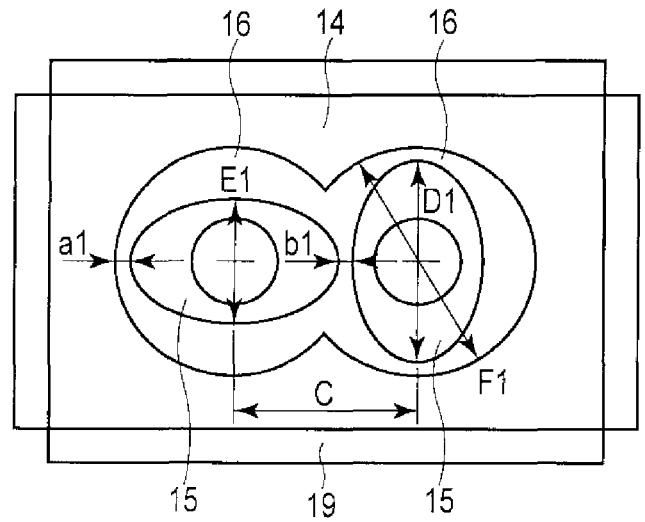
F I G. 2
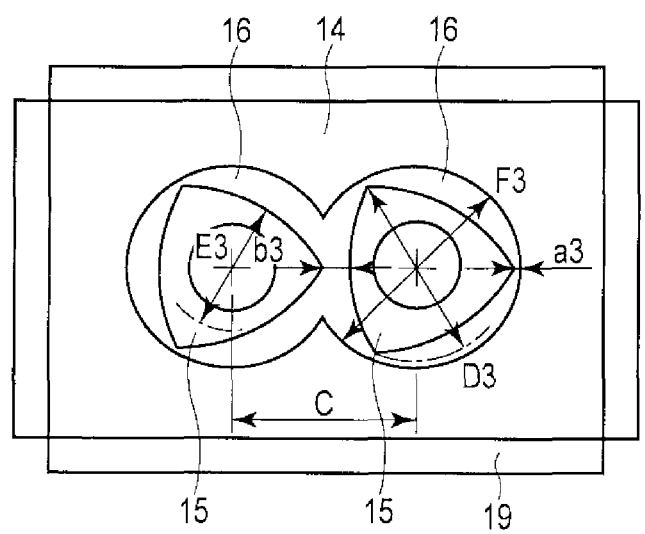
F I G. 3

TWIN-SCREW EXTRUDER INCLUDING VARIABLE DIAMETER OF SCREWS AND BARREL AND KNEADING METHOD USING THE TWIN-SCREW EXTRUDER INCLUDING VARIABLE DIAMETER OF SCREWS AND BARREL

CROSS REFERENCE TO RELATED APPLICATIONS

This application is a Continuation Application of PCT Application No. PCT/JP2014/060421, filed Apr. 10, 2014 and based upon and claiming the benefit of priority from prior Japanese Patent Application No. 2013-102652, filed May 15, 2013, the entire contents of all of which are incorporated herein by reference.

BACKGROUND OF THE INVENTION

1. Field of the Invention

The present invention described herein relate generally to a twin-screw extruder which kneads materials such as resin raw materials and is especially used for kneading resin raw materials and powdery fillers, and a kneading method using the twin-screw extruder.

2. Description of the Related Art

A twin-screw extruder which kneads materials such as resin raw materials in pellet or powdery form has been known. In general, the twin-screw extruder comprises a material feed opening which feeds materials, insertion holes through which the materials fed from the material feed opening pass, and a barrel comprising a discharge opening which discharges the materials kneaded during the passage through the insertion holes. Two screws are inserted into the insertion holes of the barrel. The two screws are provided parallel to each other, maintaining a certain distance between them. The two screws rotate in the same direction while they engage with each other.

For example, Patent Literature 1 discloses a twin-screw extruder comprising the above barrel and two screws. Its performance is high in processing materials. Thus, the residence time of materials in the barrel is shortened, and the physical properties of kneaded materials are not degraded. For example, Patent Literature 2 discloses a twin-screw extruder comprising the above barrel and two screws. The twin-screw extruder further comprises an air vent device to increase the production capacity.

As the screw provided in the above twin-screw extruders, a sectional screw whose shape (structure) can be changed is employed to knead various materials. The sectional screw is composed by fitting a plurality of screw elements or kneading discs having the same external diameter into the external circumference of the screw shaft. The shape (structure) of the sectional screw composed in this manner is suitable for the materials to be kneaded.

In the conventional technique, twin-screw extruders have been improved as follows. A deep-groove screw of a double thread screw has been employed to increase the amount of materials to be processed per unit time. The kneading volume of the screw has been increased by reducing the root diameter of the screw relative to the external diameter of the screw. In addition, the rotary driving force of the screw has been increased. To reduce the root diameter of the screw, the external diameter of the screw shaft should be also reduced. On the other hand, to increase the rotary driving force of the screw, the strength of the screw shaft should be increased. Thus, the strength of the screw shaft needs to be increased while the external diameter of the screw shaft is made smaller. To solve this problem, for example, the shaft disclosed in Patent Literature 3 can be used. In the shaft, a high strength spline is formed.

As described above, twin-screw extruders have been improved to increase the amount of materials to be processed per unit time. Recently, the root diameter of the screw or the external diameter of the screw shaft is approaching a limiting value in terms of design.

CITATION LIST

Patent Literature

Patent Literature 1: JP 11-512666 A
Patent Literature 2: JP 2000-25094 A
Patent Literature 3: JP 10-238548 A

BRIEF SUMMARY OF THE INVENTION

Technical Problem

In a twin-screw extruder, for example, resin raw materials and powdery fillers are used as materials. Resin raw materials and powdery fillers are fed through a material feed opening with a predetermined proportion. The fillers are uniformly dispersed into the materials. In this manner, a kneading process is performed. In this kneading process, the operating conditions of the twin-screw extruder are determined, satisfying the following requirements: the degradation of the physical properties by the thermal history of kneaded materials is within an allowable range; and the dispersed state of the fillers in the materials is within an allowable range. When materials are fed through the material feed opening, air is mixed in the powder fillers. The mixed air is removed while the materials are melted and kneaded inside the twin-screw extruder. Thus, the volume of the materials is reduced. If the rate of screw rotation is high, the materials whose volume is reduced are strongly influenced by a shear action. Thus, the material temperature is increased. The physical properties are easily degraded because of heat. Conversely, if the rate of screw rotation is low, the shear action exerted for the materials is insufficient. Thus, the dispersed state of the fillers in the materials is easily non-uniform.

In the twin-screw extruder, to simultaneously satisfy two requirements for the physical properties and the dispersed state of kneaded materials, the rate of screw rotation must be appropriately set in accordance with the amount of materials to be supplied. However, the conventional twin-screw extruder, which has attached weight to increase in the amount of materials to be processed per unit time and has been improved in terms of the screw, the screw shaft and the rotary driving force of the screw, cannot fully exert its performance.

In consideration of the above situation of the conventional technique, embodiments described herein aim to provide a twin-screw extruder and a kneading method using the twin-screw extruder, in which, when the fed materials are kneaded, the degradation of the physical properties and the dispersed state of the kneaded materials are within allowable ranges and further, the amount of materials to be processed per unit time is large, thereby achieving excellent productivity.

Solution to Problem

According to one present of invention, a twin-screw extruder comprises a barrel comprising a material feed opening at an end and a discharge opening at the other end. The twin-screw extruder further comprises two screws which are provided in the barrel parallel to each other, maintaining a certain shaft distance C. The two screws rotate in the same direction while the screws engage with each other. Each of the screws comprises a first screw portion, a second screw portion and a third screw portion from the end of the barrel toward the other end of the barrel. The first screw portions comprise double thread screws engaging with each other. Ratio D1/C of external diameter D1 of the first screw portion to the shaft distance C ranges from 1.25 to 1.40. The third screw portions comprise triple thread screws engaging with each other. Ratio D3/C of external diameter D3 of the third screw portion to the shaft distance C ranges from 1.05 to 1.10. External diameter D2 of the second screw portion decreases gradually from the first screw portion toward the third screw portion. The barrel comprises a first barrel portion, a second barrel portion and a third barrel portion corresponding to the screws. An insertion hole of the screws in the first barrel portion comprises a predetermined gap relative to external diameter D1 of the first screw portion. The insertion hole of the screws in the third barrel portion comprises a predetermined gap relative to external diameter D3 of the third screw portion. The insertion hole of the screws in the second barrel portion decreases gradually from the first barrel portion toward the third barrel portion.

According to another present of invention, a kneading method uses a twin-screw extruder. The twin-screw extruder comprises a barrel comprising a material feed opening at an end and a discharge opening at the other end. The twin-screw extruder further comprises two screws which are provided in the barrel parallel to each other, maintaining a certain shaft distance C. The two screws rotate in the same direction while the screws engage with each other. Each of the screws comprises a first screw portion, a second screw portion and a third screw portion from the end of the barrel toward the other end of the barrel. The barrel comprises a first barrel portion, a second barrel portion and a third barrel portion corresponding to the first screw portion, the second screw portion and the third screw portion. The two screws transfer a material fed through the material feed opening to the discharge opening while the material is kneaded. The kneaded material is discharged through the discharge opening. The first screw portions comprise double thread screws engaging with each other. Ratio D1/C of external diameter D1 of the first screw portion to the shaft distance C ranges from 1.25 to 1.40. An insertion hole of the screws in the first barrel portion comprises a predetermined gap relative to external diameter D1 of the first screw portion. The first screw portion transfers the material fed through the material feed opening such that the material passes through a first portion including the first screw portion and the first barrel portion. The second screw portion is structured such that external diameter D2 decreases gradually from the first screw portion toward the third screw portion. The insertion hole of the screws in the second barrel portion is structured so as to decrease gradually from the first barrel portion toward the third barrel portion. The second screw portion transfers the material transferred from the first portion such that the material passes through a second portion including the second screw portion and the second barrel portion. The third screw portions comprise triple thread screws engaging with each other. Ratio D3/C of external diameter D3 of the third screw portion to the shaft distance C ranges from 1.05 to 1.10. The insertion hole of the screws in the third barrel portion comprises a predetermined gap relative to external diameter D3 of the third screw portion. The third screw portion transfers the material transferred from the second portion such that the material passes through a third portion including the third screw portion and the third barrel portion.

In the above twin-screw extruder and the kneading method using the twin-screw extruder, the two screws are provided parallel to each other, maintaining the certain shaft distance C. The two screws rotate in the same direction while the screws engage with each other. Each of the screws comprises the first screw portion having a double thread screw in which external diameter D1 is large. Further, each of the screws comprises the third screw portion having a triple thread screw in which external diameter D3 is small. Therefore, even if the mixed air is removed from the fed materials including resin raw materials and powdery fillers, and the material volume is reduced, a shear action can be appropriately exerted by the rotation of the screws. Further, the degradation of the physical properties and the dispersed state of the kneaded materials can be maintained so as to be within allowable ranges.

In addition, in the twin-screw extruder and the kneading method using the twin-screw extruder, ratio D1/C of external diameter D1 of the first screw portion to the shaft distance C ranges from 1.25 to 1.40. Therefore, the amount of materials to be processed per unit time is larger than that of the conventional twin-screw extruder. In this manner, it is possible to perform a kneading process, achieving excellent productivity in comparison with the conventional twin-screw extruder.

Advantageous Effects of Invention

According to the twin-screw extruder and the kneading method using the twin-screw extruder of the embodiments described herein, when the fed materials are kneaded, it is possible to maintain the degradation of the physical properties and the dispersed state of the kneaded materials so as to be within allowable ranges. Further, the amount of materials to be processed per unit time can be large. Thus, the productivity can be improved.

BRIEF DESCRIPTION OF THE SEVERAL VIEWS OF THE DRAWING

FIG. 1 is a schematic view of a twin-screw extruder according to an embodiment.

FIG. 2 is the I-I cross-sectional view of FIG. 1.

FIG. 3 is the II-II cross-sectional view of FIG. 1.

DETAILED DESCRIPTION OF THE INVENTION

Embodiments will be described hereinafter with reference to FIG. 1, FIG. 2, FIG. 3 and Table 1.

FIG. 1 shows the general structure of a twin-screw extruder 10 according to an embodiment.

The twin-screw extruder 10 comprises a gearbox 11. The gearbox 11 comprises two output shafts 12. The two output shafts 12 are provided parallel to each other, maintaining a certain shaft distance C between them. The two output shafts 12 rotate in the same direction. The gearbox 11 delivers the torque obtained from a drive motor 13 connected to the gearbox 11 to two screws 15 through the output shafts 12. The basal portions of the two screws 15 are connected to the output shafts 12. In a barrel, in a manner similar to that of the two output shafts 12, the two screws 15 are provided parallel to each other, maintaining the shaft distance C between them. The rotation of the drive motor 13 is delivered to the two screws 15 via the respective output shafts 12. In this manner, the two screws 15 rotate in the same direction while they engage with each other.

Inside the barrel 14, two insertion holes 16 are provided. The screws 15 are inserted into the insertion holes 16. The insertion holes 16 are holes provided along the longitudinal direction of the barrel 14. The insertion holes 16 partially overlap with each other in the circumferential direction such that the two screws 15 engaging with each other can be inserted into the insertion holes 16. A longitudinal end of the barrel 14 is close to the gearbox 11. At this end, a material feed opening 17 is provided to feed materials (resin raw materials and powdery fillers) to be kneaded into the insertion holes 16. At the other longitudinal end of the barrel 14, a discharge opening 18 is provided to discharge the materials which are kneaded while they pass through the insertion holes 16. In the outer circumference of the barrel 14, a heater 19 is provided to heat the materials supplied to the insertion holes 16 by heating the barrel 14.

From the end of the barrel 14 in which the material feed opening 17 is provided toward the other end of the barrel 14 in which the discharge opening 18 is provided, each of the screws 15 comprises a first screw portion 21, a second screw portion 22 and a third screw portion 23. From the end comprising the material feed opening 17 toward the other end comprising the discharge opening 18, the barrel 14 comprises a first barrel portion 31, a second barrel portion 32 and a third barrel portion 33 corresponding to the first screw portion 21, the second screw portion 22 and the third screw portion 23 of each screw 15.

In the longitudinal direction, the entire length L of the barrel 14, length L1 of the first barrel portion 31 and the first screw portion 21, length L2 of the second barrel portion 32 and the second screw portion 22, and length L3 of the third barrel portion 33 and the third screw portion 23 are arbitrarily determined in accordance with the materials to be kneaded.

In the present embodiment, between the material feed opening 17 and the discharge opening 18 of the barrel 14, the twin-screw extruder 10 comprises a vent port (not shown) for discharging, for example, volatile components produced from the materials during kneading to the outside of the barrel 14, and an air vent mechanism (not shown) for discharging air mixed in the materials to the outside of the barrel 14.

In a manner similar to that of the conventional twin-screw extruder, each screw 15 of the twin-screw extruder 10 is a sectional screw which comprises a kneading disc, etc., between screw elements such that various materials are kneaded.

FIG. 2 and FIG. 3 show the structures of cross-sectional surfaces of the twin-screw extruder 10. FIG. 2 shows the II-II cross-sectional surface of the first screw portions 21 and the first barrel portion 31 shown in FIG. 1. FIG. 3 shows the III-III cross-sectional surface of the third screw portions 23 and the third barrel portion 33 shown in FIG. 1.

As shown in FIG. 2, each first screw portion 21 provided on the material feed opening 17 side comprises a double thread screw. External diameter D1 of the first screw portion 21 is set such that ratio D1/C of external diameter D1 to the shaft distance C ranges from 1.25 to 1.40 ($1.25 \leq D1/C \leq 1.40$). This ratio is set so as to be greater than ratio S/C of external diameter S of the screw to the shaft distance C of the conventional twin-extruder which attaches importance to increase in the amount of materials to be processed per unit time. In other words, when the twin-screw extruder 10 of the present embodiment and the conventional twin-screw extruder comprise the same gearbox 11 and have the same shaft distance C, external diameter D1 of the first screw portion 21 of the twin-screw extruder 10 of the present embodiment is set so as to be greater than external diameter S of the screw of the conventional twin-screw extruder.

In the conventional twin-screw extruder, the root diameter of the screw or the external diameter of the screw shaft is approaching a limiting value in terms of design. However, when resin raw materials and powdery filling materials are kneaded, the screw or screw shaft of the conventional twin-screw extruder is excessively strong. By reducing the thickness of the screw or screw shaft by an amount equivalent to the excess of strength, ratio D1/C of external diameter D1 to the shaft distance C can be set so as to range from 1.25 to 1.40. If ratio D1/C exceeds 1.40 (D1/C>1.40), the strength of the screw or screw shaft is insufficient even in a case where resin raw materials and powdery filling materials are kneaded. Thus, a value greater than 1.40 is undesirable as ratio D1/C.

As shown in FIG. 3, each third screw portion 23 provided on the discharge opening 18 side comprises a triple thread screw. External diameter D3 of the third screw portion 23 is set such that ratio D3/C of external diameter D3 to the shaft distance C ranges from 1.05 to 1.10 ($1.05 \leq D3/C \leq 1.10$). This ratio is set so as to be less than ratio S/C of external diameter S of the screw to the shaft distance C of the conventional twin-screw extruder which attaches importance to increase in the amount of materials to be processed per unit time. In other words, when the twin-screw extruder 10 of the present embodiment and the conventional twin-screw extruder comprise the same gearbox 11 and have the same shaft distance C, external diameter D3 of the third screw portion 23 of the twin-screw extruder 10 of the present embodiment is set so as to be less than external diameter S of the screw of the conventional twin-screw extruder.

If ratio D3/C is less than 1.05 (D3/C<1.05), the root portion of the screw is shallow, thereby impairing the ability to transfer materials in the twin-screw extruder 10. Thus, a value less than 1.05 is undesirable as ratio D3/C.

External diameter D2 of the second screw portions 22 engaging with each other is reduced relatively and gradually from the first screw portions 21 toward the third screw portions 23 such that the first screw portions 21 having the large external diameter D1 are smoothly connected to the third screw portions 23 having the small external diameter D3.

Each insertion hole 16 of the first barrel portion 31 corresponding to the first screw portion 21 on the material feed opening 17 side is set so as to have hole diameter F1 in which a predetermined gap a1 is provided relative to external diameter D1 of the first screw portion 21 (F1=D1+2×a1). Gap a1 of the first barrel portion 31 is set such that ratio a1/C of gap a1 to the shaft distance C ranges from 0.005 to 0.015 ($0.005 \leq a1/C \leq 0.015$).

Each insertion hole 16 of the third barrel portion 33 corresponding to the third screw portion 23 on the discharge portion 18 side is set so as to have hole diameter F3 in which a predetermined gap a3 is provided relative to external diameter D3 of the third screw portion 23 (F3=D3+2×a3). Hole diameter F3 of each insertion hole 16 of the third barrel portion 33 is relatively less than hole diameter F1 of each insertion hole 16 of the first barrel portion 31. Gap a3 of the third barrel portion 33 is set such that ratio a3/C of gap a3 to the shaft distance C ranges from 0.005 to 0.015 ($0.005 \leq a3/C \leq 0.015$) in a manner similar to that of gap a1.

Hole diameter F2 of each insertion hole 16 of the second barrel portion 32 is reduced gradually from the first barrel portion 31 toward the third barrel portion 33 such that the insertion hole 16 of the first barrel portion 31 having the large hole diameter F1 is smoothly connected to the insertion hole 16 of the third barrel portion 33 having the small hole diameter F3.

The first screw portions 21 of the two screws 15 engaging with each other have engagement gap b1. Engagement gap b1 of the first screw portions 21 is set such that ratio b1/C of gap b1 to the shaft distance C ranges from 0.01 to 0.02 ($0.01 \leq b1/C \leq 0.02$).

Root diameter E1 of the first screw portions 21 is expressed by $C=b1+(D1+E1)/2$.

The third screw portions 23 also have engagement gap b3. Engagement gap b3 of the third screw portions 23 is set such that ratio b3/C of gap b3 to the shaft distance C ranges from 0.01 to 0.02 ($0.01 \leq b3/C \leq 0.02$).

Root diameter E3 of the third screw portions 23 is also expressed by $C=b3+(D3+E3)/2$.

Now, this specification explains the effect of the twin-screw extruder 10 of the present embodiment.

The barrel 14 of the twin-screw extruder 10 is heated by the heater 19 in advance so as to attain a predetermined temperature. When the drive motor 13 rotates, the two screws 15 inserted into the two insertion holes 16 of the barrel 14 rotate in the same direction while the screws 15 engage with each other.

Resin raw materials and powdery fillers are used as materials to be kneaded. Only a predetermined weight of material is fed into the material feed opening 17 per unit time by a material feed device (not shown). The fed materials are transferred to the second screw portions 22 and the second barrel portion 32 while the materials are heated, melted and kneaded in the first barrel portion 31 and the first screw portions 21 comprising double thread screws. At this time, the volatile components produced from the materials are discharged through the vent port (not shown). The air mixed in the materials is discharged through the air vent mechanism (not shown).

The first screw portions 21 comprise double thread screws and are set such that ratio D1/C of external diameter D1 to the shaft distance C ranges from 1.25 to 1.40. Therefore, the kneading volume of the screws, and the amount of materials to be transferred and kneaded per unit time are large in comparison with the conventional twin-screw extruder.

By melting and kneading the materials in the first screw portions 21 and the first barrel portion 31, the mixed air is removed. Thus, the volume of the materials is reduced. These materials pass through the second screw portions 22 in which external diameter D2 decreases gradually from external diameter D1 to external diameter D3 and the second barrel portion 22 in which hole diameter F2 decreases gradually from hole diameter F1 to hole diameter F3. In this way, the materials are transferred to the third screw portions 23 and the third barrel portion 33.

The third screw portions 23 are set such that ratio D3/C of external diameter D3 to the shaft distance C ranges from 1.05 to 1.10. In association with the decrease in the volume of materials, the kneading volume of the screws is small. Since the third screw portions 23 comprise triple thread screws, powdery fillers can be uniformly dispersed into the melted materials in comparison with double thread screws.

External diameter D3 of each third screw portion 23 is less than external diameter D1 of each first screw portion 21. Thus, the circumferential velocity of the screw thread of each third screw portion 23 is lower than that of each first screw portion 21. Therefore, even if the rate of rotation of the screws 15 is increased to raise the amount of materials to be processed per unit time, the resin included in the materials is not excessively influenced by a shear action in the third screw portions 23. In this manner, it is possible to prevent increase in the material temperature such that the degradation of the physical properties falls within an allowable range.

With reference to table 1, various embodiments and comparison examples are explained.

TABLE 1

|  | Rate of screw rotation ($min^{-1}$) | Processing amount per unit time (kg/h) | Material temperature (° C.) | Dispersed state |
| --- | --- | --- | --- | --- |
| Embodiment 1 | 340 | 200 | 230.3 | ○ |
| Embodiment 2 | 500 | 300 | 235.7 | ○ |
| Comparison Example 1 | 380 | 200 | 232.6 | X |
| Comparison Example 2 | 620 | 300 | 246.2 | X |

Embodiment 1

The applicant of the present application prepared the twin-screw extruder 10 by modifying the shapes of the insertion holes 16 of the barrel 14 and the screws 15 based on the conventional twin-screw extruder of TEM-48 manufactured by Toshiba Machine Co., Ltd. In the conventional twin-screw extruder, the nominal diameter of the external shape of the screw is 48 mm. In the twin-screw extruder 10 of the present embodiment, ratio D1/C of external diameter D1 of each first screw portion 21 to the shaft distance C is 1.26 (D1/C=1.26), and ratio D3/C of external diameter D3 of each third screw portion 23 to the shaft distance C is 1.09 (D3/C=1.09).

For the materials to be kneaded, the applicant of the present application used polypropylene (PP) having a melt flow index (MI value) of 25 in pellet form, and powdery talc having a particle diameter of 5 μm. The applicant performed a kneading process for dispersing 30% by weight of talc into 70% by weight of polypropylene, using the twin-screw extruder 10.

The twin-screw extruder 10 of the present embodiment showed a processing amount of 200 kg/h (200 kg per hour) at a rate of screw rotation of 340 $min^{-1}$. At this time, the material temperature was 230.3° C. in the discharge opening 18. The dispersed state of talc in the kneaded materials was uniform and good (○).

Embodiment 2

The applicant of the present application performed a kneading process, using the same twin-screw extruder 10 and the same materials as embodiment 1.

The twin-screw extruder 10 of the present embodiment showed a processing amount of 300 kg/h (300 kg per hour) at a rate of screw rotation of 500 $min^{-1}$. At this time, the material temperature was 235.7° C. in the discharge opening 18. The dispersed state of talc in the kneaded materials was uniform and good (○).

Comparison Example 1

The applicant of the present application performed a kneading process, using the same materials as embodiments 1 and 2 and the conventional twin-screw extruder of TEM-48 manufactured by Toshiba Machine Co., Ltd., in which the nominal diameter of the external shape of the screw was 48 mm. Each screw of this twin-screw extruder comprises a double thread screw having the same external diameter from the basal portion to the apical end. Ratio S/C of external diameter S of the screw to the shaft distance C is 1.18.

This twin-screw extruder showed a processing amount of 200 kg/h (200 kg per hour) at a rate of screw rotation of 380 $min^{-1}$. At this time, the material temperature was 232.6° C. in the discharge opening. The dispersed state of talc in the kneaded materials was poor (X) as aggregation of talc was discovered in some places.

Comparison Example 2

The applicant of the present application performed a kneading process, using the same conventional twin-screw extruder and the same materials as comparison example 1.

This conventional twin-screw extruder showed a processing amount of 300 kg/h (300 kg per hour) at a rate of screw rotation of 620 $min^{-1}$. At this time, the material temperature was 246.2° C. in the discharge opening. The dispersed state of talc in the kneaded materials was poor (X) as aggregation of talc was discovered in some places.

The comparisons between embodiment 1 and comparison example 1 and between embodiment 2 and comparison example 2 show that the twin-screw extruder 10 of the embodiments can obtain a predetermined processing amount per unit time at a rate of screw rotation less than the conventional twin-screw extruder in the kneading of materials. In other words, the comparisons reveal that the twin-screw extruder 10 of the embodiments has the following effects in comparison with the conventional twin-screw extruder: the processing amount per unit time is large; the material temperature connected to the degradation of the physical properties of kneaded materials is low; and the dispersed state of talc in the kneaded materials is good. Thus, the twin-screw extruder 10 of the embodiments shows a great effect.

When the degree of change from embodiment 1 to embodiment 2 is compared with the degree of change from comparison example 1 to comparison example 2, where the processing amount per unit time is increased from 200 to 300 kg/h, the increase in the rate of screw rotation is less in the twin-screw extruder 10 of the embodiments than in the conventional twin-screw extruder. Further, the increase in the material temperature is less in the twin-screw extruder 10 of the embodiments than in the conventional twin-screw extruder.

In this manner, the twin-screw extruder 10 of the above embodiments is capable of maintaining the degradation of the physical properties and the dispersed state of the kneaded materials within allowable ranges. In addition, the amount of materials to be processed per unit time is large. Thus, the twin-screw extruder 10 of the above embodiments can perform kneading more productively than the conventional twin-screw extruder.

The gearbox 11 of the twin-screw extruder 10 used in embodiments 1 and 2 is the same as the gearbox of the conventional twin-screw extruder used in comparison examples 1 and 2. The shaft distance C of the twin-screw extruder 10 used in embodiments 1 and 2 is also the same as the shaft distance of the conventional twin-screw extruder used in comparison examples 1 and 2. The twin-screw extruder 10 of the embodiments described herein can be structured by reducing the thickness of the screw and screw shaft of the conventional twin-screw extruder which attaches importance to the processing amount per unit time by the excess of strength, and modifying the shapes of the insertion holes 16 of the barrel 14 and the screws 15. Therefore, the twin-screw extruder 10 of the embodiments described herein may not be designed or manufactured from scratch. The twin-screw extruder 10 of the embodiments may be produced by modifying the insertion holes 16 of the barrel 14 and the screws 15 based on the conventional twin-screw extruder. The twin-screw extruder 10 of the embodiments may be obtained by making alterations to the barrel and the screws of the conventional twin-screw extruder which has been already provided.

However, the effects of the twin-screw extruder 10 of the embodiments cannot be achieved if only the external and internal diameters of the third screw portions 23 and the third barrel portion 33 are changed without modifying the external and internal diameters of the first screw portions 21 and the first barrel portion 31 as the conventional ones based on the conventional twin-screw extruder, or if only the external and internal diameters of the first screw portions 21 and the first barrel portion 31 are changed without modifying the external and internal diameters of the third screw portions 23 and the third barrel portion 33 as the conventional ones based on the conventional twin-screw extruder.

In the above embodiments, polypropylene in pellet form and powdery talc are used for the materials to be kneaded. However, the materials to be kneaded by the twin-screw extruder or the kneading method using the twin-screw extruder of the embodiments are not limited to the above example. The twin-screw extruder and the kneading method using the twin-extruder of the embodiments are applicable to the kneading of various resin raw materials, powdery fillers, etc. In addition, the twin-screw extruder and the kneading method using the twin-screw extruder of the above embodiments can be applied to the kneading of powdery resin raw materials.

What is claimed is:

1. A twin-screw extruder comprising:
  a barrel comprising a material feed opening at an end, and a discharge opening at the other end; and
  two screws provided in the barrel parallel to each other, maintaining a certain center distance C between a center of a shaft of one screw and a center of a shaft of the other screw, the two screws rotating in the same direction while the screws engage with each other, wherein
  each of the screws comprises a first screw portion, a second screw portion and a third screw portion from the end of the barrel toward the other end of the barrel,
  the first screw portions comprise double thread screws engaging with each other,
  a ratio D1/C of an external diameter D1 of the first screw portion to the center distance C ranges from 1.25 to 1.40,
  the third screw portions comprise triple thread screws engaging with each other,
  a ratio D3/C of an external diameter D3 of the third screw portion to the center distance C ranges from 1.05 to 1.10,
  an external diameter D2 of the second screw portion is decreased from the external diameter D1 of the first screw portion to the external diameter D3 of the third screw portion such that the first screw portion is connected to the third screw portion, the barrel comprises a first barrel portion, a second barrel portion and a third barrel portion corresponding to the screws, an insertion hole of the screws in the first barrel portion comprises a predetermined gap relative to the external diameter D1 of the first screw portion, the insertion hole of the screws in the third barrel portion comprises a predetermined gap relative to the external diameter D3 of the third screw portion, and a hole diameter F2 of the insertion hole in the second barrel portion is decreased from an hole diameter F1 of the insertion hole in the first barrel portion such that the first barrel portion is connected to the third barrel portion.

2. A kneading method using a twin-screw extruder comprising:

a barrel comprising a material feed opening at an end, and a discharge opening at the other end; and two screws provided in the barrel parallel to each other, maintaining a certain center distance C between a center of a shaft of one screw and a center of a shaft of the other screw, the two screws rotating in the same direction while the screws engage with each other, wherein each of the screws comprises a first screw portion, a second screw portion and a third screw portion from the end of the barrel toward the other end of the barrel, the barrel comprises a first barrel portion, a second barrel portion and a third barrel portion corresponding to the first screw portion, the second screw portion and the third screw portion, the two screws transfer a material fed through the material feed opening to the discharge opening while the material is kneaded, the kneaded material is discharged through the discharge opening, the first screw portions comprise double thread screws engaging with each other, a ratio D1/C of an external diameter D1 of the first screw portion to the center distance C ranges from 1.25 to 1.40, an insertion hole of the screws in the first barrel portion comprises a predetermined gap relative to the external diameter D1 of the first screw portion, the first screw portion transfers the material fed through the material feed opening such that the material passes through a first portion including the first screw portion and the first barrel portion, the second screw portion is structured such that an external diameter D2 is decreased from the external diameter D1 of the first screw portion to the external diameter D3 of the third screw portion such that the first screw portion is connected to the third screw portion, a hole diameter F2 of the insertion hole in the second barrel portion is decreased from an hole diameter F1 of the insertion hole in the first barrel portion such that the first barrel portion is connected to the third barrel portion, the second screw portion transfers the material transferred from the first portion such that the material passes through a second portion including the second screw portion and the second barrel portion, the third screw portions comprise triple thread screws engaging with each other, a ratio D3/C of an external diameter D3 of the third screw portion to the center distance C ranges from 1.05 to 1.10, the insertion hole of the screws in the third barrel portion comprises a predetermined gap relative to the external diameter D3 of the third screw portion, and the third screw portion transfers the material transferred from the second portion such that the material passes through a third portion including the third screw portion and the third barrel portion.

* * * * *